United States Patent [19]

Tregurtha et al.

[11] 4,297,549
[45] Oct. 27, 1981

[54] DIRECTION INDICATOR SWITCH

[75] Inventors: Steven J. Tregurtha, Near Acrington; Edward Cryer, Burnley, both of England

[73] Assignee: Lucas Industries Limited, Birmingham, England

[21] Appl. No.: 73,557

[22] Filed: Sep. 7, 1979

[30] Foreign Application Priority Data

Sep. 12, 1978 [GB] United Kingdom ............ 36233/78

[51] Int. Cl.³ .............................................. H01H 3/16
[52] U.S. Cl. .............................. 200/61.27; 200/61.34; 200/61.54
[58] Field of Search .................... 200/61.27–61.38, 200/61.54

[56] References Cited
U.S. PATENT DOCUMENTS 3,413,426  11/1968  McClure et al. ............ 200/61.27

Primary Examiner—J. V. Truhe
Assistant Examiner—Morris Ginsburg
Attorney, Agent, or Firm—Holman & Stern

[57] ABSTRACT

A direction indicator switch wherein the relatively fixed body of the switch carries a rotor movable manually relative thereto from a central rest position to either of first and second operative positions on opposite sides respectively of the rest position. The body carries a striker collar which is rotatable relative to the body with the steering shaft of the vehicle in use. Rotation of the striker collar is intended to effect return movement of the rotor from either of its operative positions to the rest position. A releasable latch is provided on the body whereby the striker collar is retained in a predetermined angular position relative to the body during assembly of the switch to the vehicle. After assembly of the switch to the vehicle the latch is released to permit the collar to rotate with the steering shaft of the vehicle relative to the body.

5 Claims, 1 Drawing Figure

U.S. Patent   Oct. 27, 1981   4,297,549
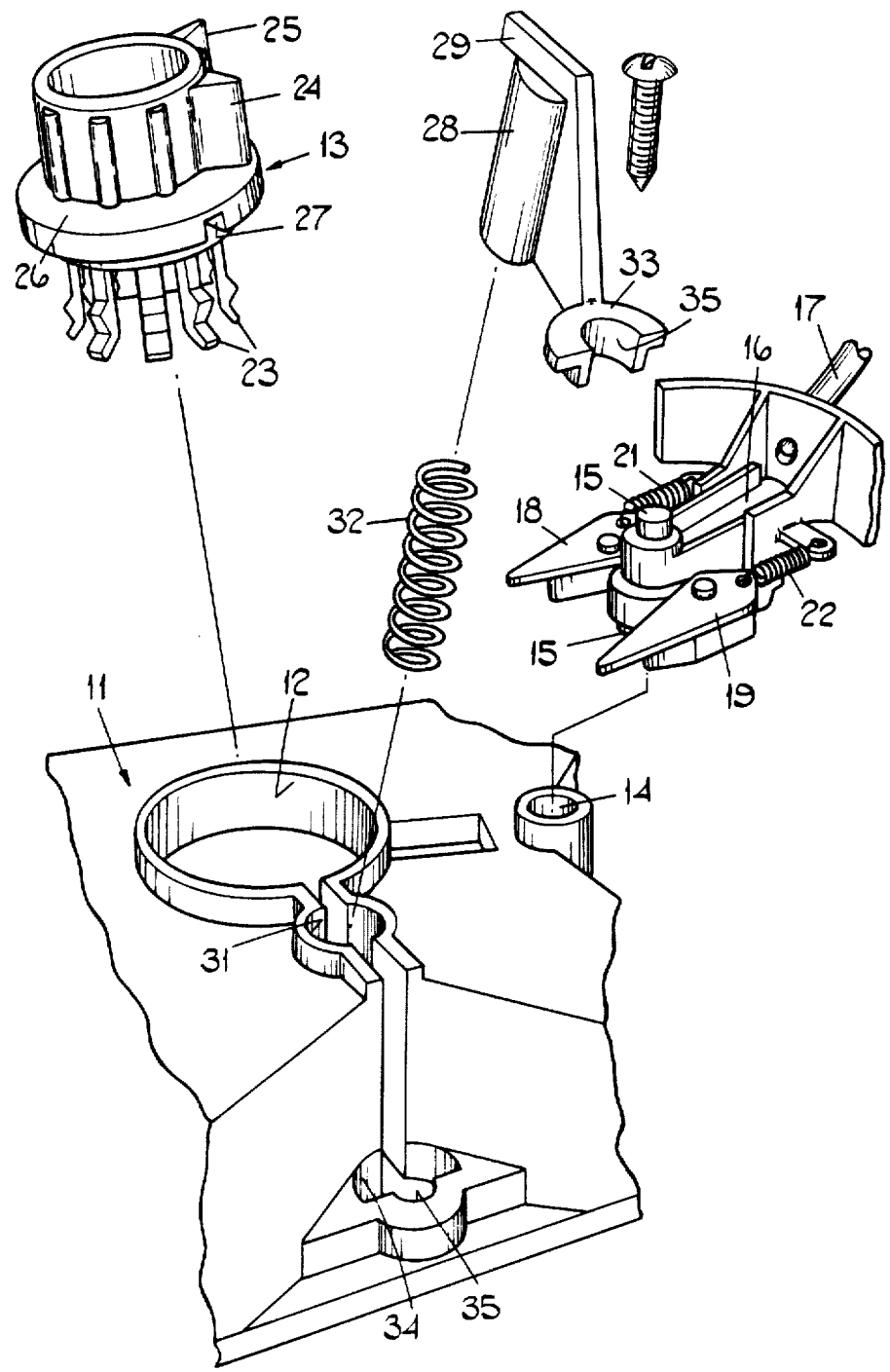

DIRECTION INDICATOR SWITCH

BRIEF SUMMARY OF THE INVENTION

This invention relates to a direction indicator switch for a vehicle, the switch being of the kind including a striker collar rotatable with the steering shaft of the vehicle, whereby in use, the switch is cancelled from a manually selected operative position to an inoperative rest position, the collar being adjustable angularly in position relative to the shaft during installation of the switch in the vehicle.

A problem arises in installing direction indicator switches in vehicles where the vehicle manufacturer requires that the steering shaft is not preformed with keying means (plain steering shaft), for example an axially extending channel for locating the striker collar, in that the angular position of the collar on the shaft must be accurately set in relation to the position of the switch body and cancelling mechanism relative to the shaft. Once the collar position is determined it may be retained by friction between the collar and the shaft or by additional retaining means for example a screw passing through the collar and into the shaft. The problem arises from the need to accurately position the striker lug of the collar relative to the cancelling pawl or pawls of the switch so that the switch is cancelled at the correct point in the return rotation of the shaft to the straight ahead position after negotiating a turn.

One prior attempt to minimise the effect of misalignment of the lug and the pawls was to provide a plurality of equiangularly spaced lugs on the collar. While this approach minimises the effect of misalignment it is not a complete solution to the problem.

U.S. Pat. No. 3,413,426 shows a direction indicator switch assembly wherein the striker collar encircles and rotates with a plain steering shaft but in this construction the collar is keyed to the steering wheel which in turn is keyed to the steering shaft. Vehicle manufacturers are believed to prefer to use plain steering shafts inter alia because such use removes the need to angularly position the shaft accurately in relation to the mounting location of the direction indicator switch during assembly of the vehicle. In U.S. Pat. No. 3,413,426 the steering wheel must be angularly positioned accurately on the shaft in relation to the switch location.

It is an object of the present invention to provide a direction indicator switch wherein the problem of setting of the angular position of the striker collar of switch relative to the vehicle steering shaft is minimised.

A direction indicator switch according to the invention includes a body, a member carried by the body and movable manually relative thereto from a rest position to either of first and second operative positions on opposite sides respectively of the rest position, a striker collar rotatable in use relative to said body with the steering shaft of a vehicle utilizing the switch to effect return movement of the member from either of said operative positions to said rest position, and releasable latch means whereby the striker collar is retained in a predetermined angular position relative to the body during assembly of the switch in the vehicle, said latch means being released after assembly of the switch in the vehicle to permit the collar to rotate with the steering shaft of the vehicle relative to the body.

Preferably said latch means is arranged so as to be released automatically as the switch body is secured in position in the vehicle.

Desirably the latch means is arranged to be released by the tightening of one of the securing devices which in use, retains the switch body in position in the vehicle.

Conveniently the switch includes resilient means urging said member to said rest position and detent means for holding said member in said operative position, said striker collar effecting return of said member to said rest position in use by causing release of said detent means.

Alternatively said collar, in use, effects return movement of said member to said rest position by driving the member at least to said rest position.

BRIEF DESCRIPTION OF THE DRAWING

The accompanying drawing is a diagrammatic, exploded perspective view of part of a direction indicator switch in accordance with one example of the present invention.

DETAILED DESCRIPTION

Referring to the drawing, the direction indicator switch includes a moulded synthetic resin body 11, which in use, is secured by mounting screws (not shown) to a bracket fixedly mounted on the stationary outer tube of a vehicle steering column. The rotatable steering shaft of the vehicle steering column extends through a circular aperture 12 in the body 11. A moulded synthetic resin striker collar 13 is a loose fit in the aperture 12 and in use, is a tight friction grip on the steering shaft, the collar 13 being hollow and the steering shaft extending therethrough.

The body 11 and a cover (not shown) forming part of the body 11 are both formed with a cylindrical bore 14 parallel to, and spaced from the aperture 12. The bore 14 in the body 11 and the equivalent bore in the cover are aligned and receive respective aligned and oppositely directed cylindrical posts 15 of a moulded synthetic resin rotor 16 of the switch. The rotor 16 has an elongate lever 17 secured at one end thereto, the opposite end of the lever 17 projecting from the switch to facilitate manual operation of the switch. The posts 15 engaged in the bore 14 and equivalent bore in the cover serve to mount the rotor 16 for angular movement relative to the body 11 about the axis of the posts 15.

A spring arrangement (not shown) acts between the rotor 16 and the body 11 to urge the rotor 16 to pivot about the axis of the posts 15 to a central rest position. The rotor 16 is movable from the central rest position in one direction to a first operative position, and in the other direction from the central rest position to a second operative position. A pair of detent members (not shown) act between the body 11 and the rotor 16 and are respectively capable of retaining the rotor 16 in its first, or second, operative position against the action of the spring arrangement. Fixed electrical contacts carried by the body 11 are engaged in the operative positions of the rotor, by a movable contact carried by the rotor to complete, in the first operative position, electrical circuits through the switch controlling operation of the left-hand direction indicator lamps of the vehicle, and in the second operative position, the right-hand direction indicator lamps. In the central rest position, neither indicator lamp circuit is completed.

On either side of the axis of the posts 15, the rotor 16 carries a cancelling pawl. The cancelling pawls 18, 19 are mounted for pivotal movement on the rotor 16 about axes parallel to the axis of the posts 15. Each of the pawls 18, 19 is urged by a respective spring 21, 22 to a position relative to the rotor 16 such that when the rotor 16 is in its central rest position, then the pawls 18, 19 extend generally towards the striker collar 13.

The striker collar 13 is formed at one axial end with a plurality of axially extending resilient fingers 23, which in use are encircled by a spring clip (not shown), and tightly grip the steering shaft of the vehicle. The collar 13 is also formed with a pair of angularly spaced radially outwardly projecting, axially extending lugs, 24, 25. In the central rest position of the rotor 16 the forwardly projecting ends of the pawls 18, 19 lie outside the path of movement of the lugs 24, 25 so that during rotation of the steering column the lugs 24, 25 do not co-operate with the pawls 18, 19. However when the rotor 16 is moved to its first operative position, the effect on the pawl 18 is to move the free end of the pawl 18 into the path of movement of the lugs 24, 25. When the steering shaft of the vehicle in use is being rotated in a direction to perform the indicated left-hand turn, then should one of the lugs 24, 25 engage the pawl 18, the pawl 18 will be deflected pivotting relative to the rotor 16 against the action of its spring 21. However, during return rotation of the steering shaft, after negotiation of the left-hand turn abutment of either of the lugs 24, 25 with the pawl 18 causes pivotal movement of the pawl 18 relative to the rotor 16 in the opposite direction, and such pivotal movement of the pawl 18 causes the pawl 18 to co-operate with a detent release component effecting release of the detent holding the rotor 16 in its first operative position, and thus permitting the spring arrangement to return the rotor to its central rest position, cancelling the left-hand direction indicator circuit. The pawl 19 operates in conjunction with the lugs 24, 25 in exactly the same manner, but to cancel the rotor 16 from its second operative position.

It will be recognised that this particular cancelling function is well known, and can if desired be substituted by an alternative arrangement wherein the rotor does not have a spring arrangement urging it to its central rest position from either of its operative positions, and the movement of the rotor back to its central rest position from its operative positions is caused by the action of one or other of the striker lugs bearing against an appropriately formed pawl and thus pushing the operating member back to its central rest position. Again such an arrangement is well known and in practice a spring-loaded detent arrangement holds the rotor in any one of its three positions, the detent being forcibly overcome by the driving action of the striker collar lug on the pawl to move the rotor through the first part of its return movement, the detent then, in centering the rotor in its central rest position, aiding the return action.

It will be recognised that it is not essential to provide two lugs 24, 25 on the striker collar and that a single lug can if desired be provided. However, in some instances it is preferable to provide two or more lugs, for example two lugs can be angularly spaced apart as shown.

It will be recognised that when the switch is assembled into the road vehicle it is essential, if the switch is to be cancelled at the correct points in the rotation of the steering shaft, that the collar 13 occupies a particular angular position relative to the body 11 and the pawls 18, 19 when the body 11 is secured to the stationary part of the steering column and the steering shaft occupies a position corresponding to the straight-ahead position of the vehicle. The steering shaft and the collar 13 have no inter-acting key arrangement for locating the collar 13 on the steering shaft. However, a peripheral flange 26 of the collar 13 is formed with a rectangular notch 27 which can co-operate with a latch finger 29 of a spring loaded latch 28 carried by the body 11. The body 11 is formed with a passage 31 which extends in the body 11 parallel to the axis of the collar 13. The latch 28 is slidably received in the passage 31 and is spring urged upwardly by a helical compression spring 32. The latch 28 is formed with an integral abutment member 33 which extends outside the passage 31 and which is axially aligned with a correspondingly shaped aperture 34 in the body 11. The aperture 34 can receive the abutment member 33, and together the body 11 and the abutment member 33 define a bore 35 through which one of the mounting screws of the switch extends.

Prior to assembly of the switch into the road vehicle the collar 13 is loosely received in the aperture 12, and the latch 28 is in a raised position under the action of the spring 32. The finger 29 engages in the notch 27 of the collar 13 and thus permits rotation of the collar 13 within the aperture 12 relative to the body 11. The notch 27 and the finger 29 are so arranged on the collar 13 and body 11 respectively, that when the finger 29 is engaged in the notch 27 then the lugs 24, 25 occupy the desired angular relationship with the pawls 18, 19. The switch is then assembled onto the steering column of the vehicle, which at this stage has its steering shaft in the straight-ahead position, with the steering shaft passing through the collar 13 and tightly gripped thereby. The grip is however, not sufficiently tight to prevent manual movement of the collar and switch relative to the steering shaft. The switch and collar are then moved axially down the steering shaft until the body 11 abuts the support bracket on the stationary outer part of the steering column and the body and collar 13 are moved angularly as one, relative to the steering shaft to align securing screw apertures in the body 11, including the screw receiving bore 35, with corresponding screw receiving apertures in the mounting bracket. Thereafter the securing screws are inserted and tightened to secure the body 11 in position relative to the steering column.

The securing screw which passes through the bore 35 defined in part by the body 11 and in part by the abutment member 33 of the latch 28 cooperates with the abutment member 33 which is at this stage raised under the action of the spring 32. The act of tightening this securing screw pushes the abutment member 33 into the aperture 34 of the body 11 thus depressing the latch 28 against the action of the spring 32 and withdrawing the finger 29 downwardly from the notch 27. When the screw is fully tightened the latch 28 is held in a depressed position in which the finger 29 is completely clear of the notch 27 so that thereafter the collar 13 can rotate freely relative to the body 11 as the steering shaft rotates. The grip of the collar 13 on the steering shaft is sufficiently tight that the collar 13 will not be moved relative to the steering column by the normal operations of the switch effected by the collar 13.

It will be recognised therefore that provided that the notch 27 and finger 29 are appropriately positioned in relation to the lugs 24, 25 and the pawls 18, 19 then with the steering shaft in the straight ahead position the switch can be maneouvred relative to the steering column to achieve the correct location of the switch on the steering column without affecting the accuracy of subsequent cancelling operation.

In a modification, the abutment member 33 of the latch 28 is replaced by a latch release arrangement including a member trapped between the lower surface of the body 11 and the mounting bracket on the steering column. Once again, therefore, release of the latch 28 is only affected as the body 11 is finally secured in its correct position on the stationary bracket.

In a further modification, release of the latch 28 is effected manually rather than automatically and the operator is then called upon to ensure that the positioning of the body 11 on the bracket is correct prior to release of the latch.

It will be recognised that while in the foregoing examples the collar 13 is secured to the steering shaft purely by friction, it would be possible to apply a similar latching arrangement to a construction wherein the striker collar is positively secured to the steering shaft after the switch has been correctly positioned. For example, the collar could be a loose fit on the steering shaft, and after the switch has been position in the vehicle, and before release of the latch, the collar could be secured to the steering shaft by means of a screw.

We claim:

1. A direction indicator switch and releasable latch means combination including a body, a member carried by the body and movable manually relative thereto from a rest position to either of first and second operative positions on opposite sides respectively of the rest position, a striker collar rotatable in use relative to said body with a steering shaft of a vehicle utilizing the switch to effect return movement of said member from either of said operative positions to said rest position, and said releasable latch means movably supported by said body whereby the striker collar is retained in a predetermined angular position relative to the body during assembly of the switch in the vehicle, said latch means being released after assembly of the switch in the vehicle to permit the collar to rotate with the steering shaft of the vehicle relative to the body.

2. A combination as claimed in claim 1 wherein said latch means is provided with a means arranged to automatically release the switch body when secured in position in the vehicle.

3. A combination as claimed in claim 2 wherein said means to release the switch body comprises a securing means operatively arranged between said latch means and said body to release the switch body by the tightening of said securing means which thereafter in use, retains the switch body in position in the vehicle.

4. A combination as claimed in any one of claims 1 to 3 including resilient means urging said member to said rest position, said striker collar effecting return of said member to said rest position in use by causing release of a detent means.

5. A combination as claimed in any one of claims 1 to 3 wherein said collar, in use, effects return movement of said member to said rest position by driving the member at least to said rest position.

* * * * *